Feb. 21, 1928.

Re. 16,885

H. L. COWLES

MEANS FOR INCINERATING REFUSE

Original Filed March 28, 1923

INVENTOR.

BY Harry L. Cowles

Charles R. King

ATTORNEY

Reissued Feb. 21, 1928. Re. 16,885

UNITED STATES PATENT OFFICE.

HARRY L. COWLES, OF NEW YORK, N. Y.

MEANS FOR INCINERATING REFUSE.

Original No. 1,565,549, dated December 15, 1925, Serial No. 628,195, filed March 28, 1923. Application for reissue filed April 18, 1927. Serial No. 184,781.

This invention relates to means for incinerating refuse and its main object is to provide means for the above purpose that are of greater efficiency and economy than those commonly in use. In certain of the incinerators for refuse which are now on the market it is a feature to use a small grate at the lower part and under the grate to place a burner, also to employ a plurality of small pipes extending from the grate to one side of the same, and then to extend said pipes upward to remove the waste gases from the burner without utilizing such gases above said grate. In my improved incinerating means I make use of such gases in drying the mass of refuse in the greater part of the container therefor and pass the hot gases from the gas or other burner or other suitable source perpendicularly upward along the side or sides and ends of said mass until it is dry enough to ignite, after which the combustion of the material itself aids the drying of the portion of the mass further removed from the flaming portion, and such drying is still further assisted by the hot gases and flame from the burner or burners until all the refuse that is combustible is reduced to ashes.

In connection with the improved method described above I have devised novel means for carrying out the same efficiently and economically as will appear in the description of said means in detail hereinafter. The means I prefer to employ to accomplish the above objects together with other features of my improved means of incinerating refuse, are illustrated in the drawing accompanying and forming part of this specification, and in which—

Like characters of reference refer to like parts in all the figures of the drawing.

Figure 1:
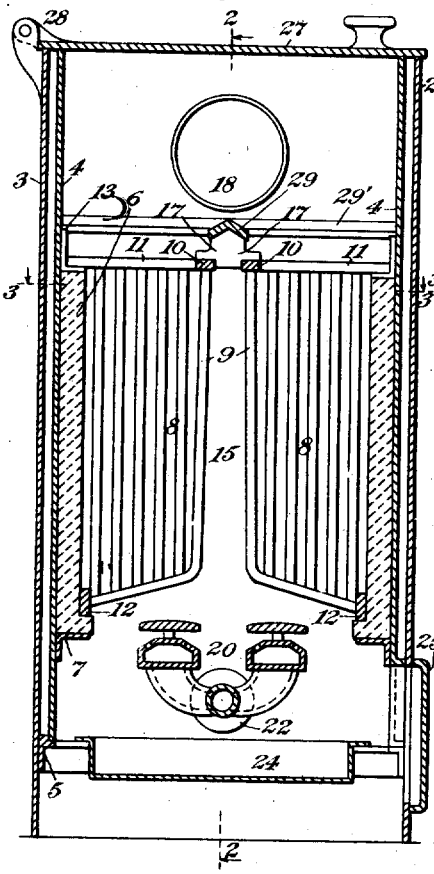
Figure 1 is a vertical section through one form of my invention taken on the line 1—1 of Figs. 2 and 3.
Figure 2:
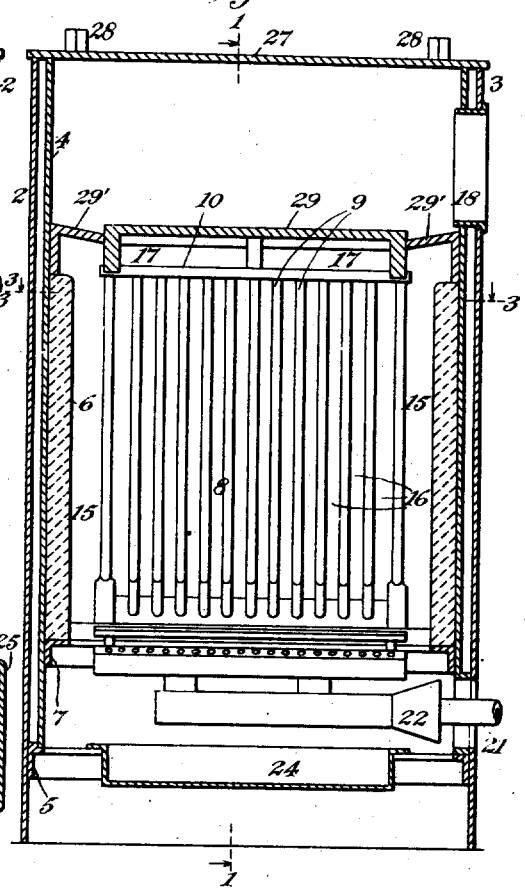
Fig. 2 is a vertical section taken on the line 2—2 of Figs. 1 and 3.
Figure 3:
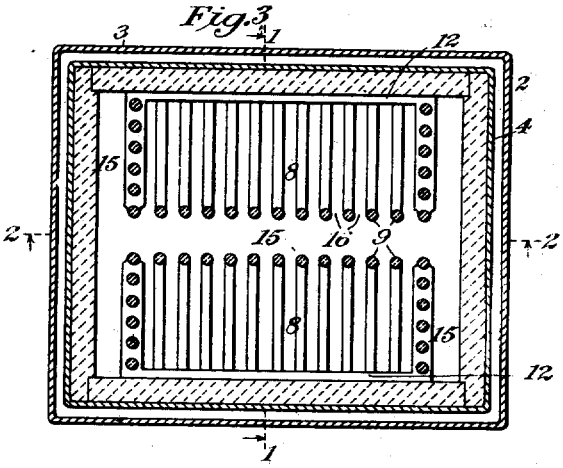
Fig. 3 is a horizontal section on the line 3—3 of Figs. 1 and 2.

In the form of my invention illustrated in Figs. 1 to 3 inclusive, the numeral 2 indicates an upright casing for the incinerating means and which preferably consists of an outer portion or wall 3 and an inner portion or wall 4 which is preferably supported by an angle member 5 secured to the outer wall 3. Ordinarily a lining 6 of refractory material such as fire brick is suitably supported inside of the wall as by means of the member 7. For holding the refuse for incineration I preferably employ a container or compartment such as indicated by 8 in the various figures of the drawing and which is formed as shown therein of L-shaped metal bars such as 9 suitably supported. Preferably the supporting means for said bars take the form of metal bars such as 10 and 11 at the upper parts and bars 12 at the lower parts of the L-shaped bars 9.

The bars 10 and 11 are supported in any suitable way such as by angle members 13 secured to the wall 4, and the bars 12 preferably are supported by resting them on a portion of the lining 6. In Figs. 1 and 3 two containers or compartments 8 are employed which are separated by a flue 15 which also extends around the ends of the containers so as to form a capital letter H in the horizontal section. The bars 9 have openings 16 between them which openings at their upper parts communicate with the flue 15.

Any suitable means for drying and igniting the refuse in the containers 8 may be employed but preferably I employ a flame which will play against the bottom part of the container, and I allow the hot gases from said flame or hot gases and flame also to pass up the flue 15 acting on the sides or side and also on the ends of the mass of refuse similarly as on the bottom of the same. Ordinarily I employ a burner adapted to burn fluid fuel such as illuminating gas or the like and the flame from the burner is directed against the bottom of the container 8 and its acts first to dry and finally to ignite the refuse through the openings 16, and the hot gases from the burner, or a portion of the flames together with the hot gases pass up said flue and dry the sides or sides and ends of the mass through the openings 16 between the bars 9, the gases finally passing out of the flues 15 laterally through the openings 17 and over the top of the refuse, and thence to the outlet pipe 18.

In the drawings 20 indicates the burner and 21 refers to the piping therefor and 22 is the mixer for mingling air with the gas supply. Ordinarily I provide a pan 24 under the burner or burners to catch ashes and any water which drips down from the refuse. There is a door 25 in the casing 2 through the doorway of which the part can be removed and the contents emptied. For placing the refuse in the incinerator I have provided a lid or top door 27 suitably hinged to the casing 2 at 28 and over the flue 15 have provided portions 29 and 29′ to prevent the refuse from falling down into the flue 15 when charging the incinerator. The portions 29 and 29′ have a further function of deflecting the gases and flames laterally over the top of the refuse in the container 8.

The method of incinerating consists in drying the refuse along one or more sides or ends of the mass of refuse by means of a stream of hot gases passing upward, also in drying the bottom portion of the mass by the flame from the burner passing through openings in the container which openings are also made to continue up along the flue or are made opening into the flue to expose the refuse to the action of the hot gases and flame. The flame and gases are then deflected laterally over the top of the refuse. The mass is then ignited by the flames from the burner through the openings in the container bottom and the ignition continues upward into the flue along the sides and ends of the mass. Drying of the interior of the mass is now effected by the burning mass together with the hot gases and flame first applied and incineration continues until all the mass that will burn is reduced to ashes.

What I claim is:—

1. The combination of a rectangular casing, two refuse compartments supported on opposite inside wall faces of said casing, rectangular in plan, having a common flue between them, and flues at each end connected to the first-mentioned one, the side and end walls of each of said compartments being composed of a multiplicity of substantially vertical bars joined at their upper ends to a horizontal U-shaped bar, and the bars forming the sides next to the common flue being L-shaped at the lower part and joined at the bottom to a horizontal bar resting on the casing wall, the lower portions of the bars of the two end walls in each compartment joined to the two end L-shaped bars respectively, heating means under said refuse compartments, and a roof over the tops of the flues inclined towards said compartments.

2. The combination of a rectangular casing, two refuse containers secured to opposite inside wall faces of said casing, rectangular and elongated in plan, having a common flue between them and flues at each end joined to the common one, the walls of said containers provided with perforations into said flues, a two part elongated burner for fluid fuel suitably connected, one burner part under each refuse container, and two burner covers, one such cover over the openings of each burner part and effective to divide the flame from each burner part into two streams, one of which streams passes directly into the common flue, joining the streams from the second burner part and the remaining stream from the first burner part, and the other stream from each burner part being directed against the lower rear part of its refuse container and flowing forward to join the other streams in said common flue.

3. The combination of a rectangular casing, two refuse compartments, rectangular and elongated in plan, narrower and shorter than the casing, the end and side walls composed of a multiplicity of vertical bars, the bars of said side walls being L-shaped, the L portions forming the bottoms of said compartments and inclined downward to the casing walls, said end walls and side walls having a multiplicity of vertical openings between said bars respectively, the openings between the L-shaped bars extending to the casing walls, a two part elongated burner for fluid fuel suitably connected, one burner part under each refuse compartment, and two elongated covers, one for each burner part and effective to extend over the burner openings and to divide the flame from each burner part into two streams, one of which passes directly up the common flue and the other of which is directed against the bottom of its respective compartment and then passes into the common flue and joins the other streams.

4. The combination of a rectangular casing, two refuse containers therein rectangular in plan having a common flue between them and each embodying a separate frame composed of a multiplicity of substantially vertical bars, those for the common flue being L-shaped, the shorter portions of the L's forming the floors of the containers, with openings between adjacent bars, means joined to the upper and lower parts of said bars to connect them and support them on the inside of the casing walls, and means below said containers for effecting the drying and igniting the contents of the same.

5. The combination of a rectangular casing, two refuse containers therein rectangular in plan, having a narrow elongated common flue between them and flues at each end, the side and end walls of said containers being in the form of separate frames each composed of a multiplicity of substantially vertical bars having openings between adjacent bars, means to connect the bars of each frame together and support it on the inside of the casing walls, floor portions arranged transversely to the vertical bars, means to connect and support the floor portions on the casing, and means below the containers for effecting the drying and igniting the contents of the same.

6. The combination with a casing, and two refuse containers secured to the walls thereof and having perforated side walls forming a common vertical flue between them and portions at the lower parts forming floors of the containers, of means for burning fluid fuel under the containers which include a portion under each of them provided with a member adapted to divide the stream of flame into two parts one of which parts passes directly up said flue and the other of which is directed against the lower rear part of its refuse container and flows along the bottom of the same into said common flue.

7. The combination with a casing, and a refuse container secured to the wall thereof and having a perforated side wall which assists in forming a vertical flue and a perforated floor portion at the lower part, of means for producing a stream of flame below the container which stream flows upward toward it, and a member adapted to divide said stream into two parts one of which passes directly into said flue and the other of which is directed against the lower rear part of the refuse container and flows along the bottom of the same into said flue.

8. The combination of a casing, two refuse containers therein having a common flue between them whose walls are formed as separate frames composed of a multiplicity of substantially vertical portions with openings between them and means to connect and support them on the inside of the casing walls, floor portions having perforations which portions are arranged at the lower parts of said containers transverse to the sides of the common flue, means to support said floor portions, and means below the containers for effecting the drying and igniting the contents of the same.

9. A refuse incinerator embodying a casing, a refuse container in said casing having upright walls, one of which is formed by a wall of said casing, and other walls of said container forming a connected frame having an apertured wall extending across the container and two end walls transverse to the first-mentioned wall, and means to support said frame whereby an upright flue of restricted width is formed next to said container walls and partially surrounding the container.

10. A refuse incinerator embodying a casing, a refuse container in said casing having four upright walls, one of which is formed by a wall of said casing and also including, an apertured side wall and two apertured end walls, said apertured walls forming three sides of a rectangle and being adjacent to and forming walls of an upright flue of restricted width, one portion of which extends across the incinerator and joins transverse portions along the end walls and partially surrounding the container.

11. The combination with an incinerator having a casing, of a refuse container having upright walls, one of which is formed by a wall of said casing and also including three walls or partitions arranged to form three sides of a rectangle and said casing wall forming the fourth side thereof, the opposite container wall being apertured and also forming a wall of a vertically disposed flue of restricted width partially surrounding the container, one part of which extends across the incinerator, said container walls being substantially parallel respectively to the other three upright casing walls.

12. A refuse incinerator embodying a casing, and two opposite refuse containers therein having upright walls, one of each of which is formed by a wall of said casing, each having an apertured side wall opposite the other refuse container, and two apertured end walls, said apertured walls being adjacent to and forming walls of a flue H-shaped in horizontal section whose middle portion extends across the incinerator and is formed by said apertured side walls, and a refuse container surrounded by the casing.

13. A refuse incinerator embodying a casing, two opposite refuse containers therein having upright walls, one of each of which is formed by a wall of the casing, each having an apertured side wall opposite the other container and substantially parallel to the casing wall, said two apertured walls forming an upright flue adjacent to each of said containers, a double inclined, apexed roof portion over said flue, and a smoke outlet higher than said apexed roof portion and substantially in alinement with the same.

14. A refuse incinerator embodying a casing, and two opposite refuse containers therein, each having an apertured side wall opposite the other refuse container and two end walls, said side walls and end walls forming walls of a flue system H-shaped in horizontal section.

15. A refuse incinerator embodying a casing, two opposite refuse containers therein having upright walls, one of each of which is formed by a wall of the casing, each having an apertured side wall opposite the other container and substantially parallel to said casing walls, and two separate end walls, said container walls also forming walls of an upright flue having a portion between the two containers adjacent to and common to each of them.

Signed at New York, in the county of New York, and State of New York, this 1st day of April, 1927.

HARRY L. COWLES.